Patented Dec. 18, 1934

1,984,678

UNITED STATES PATENT OFFICE 1,984,678

VINYL ESTER LACQUER

Willy O. Herrmann and Wolfram Haehnel, Munich, Germany, assignors, by mesne assignments, to Chemische Forschungsgesellschaft, m. b. H., Munich, Germany, a corporation of Germany No Drawing. Application March 5, 1931, Serial No. 520,467. In Germany March 14, 1930

7 Claims. (Cl. 134—26)

This invention relates to lacquers and more particularly lacquers containing polymerized vinyl esters. The polymerized vinyl esters are technically popularized today in various modifications which differ not only in their empirical composition, but also by their physical properties such as hardness, softening point, melting point, elasticity, lustre, optical refraction, solubility, viscosity in the dissolved state, drying ability, pureness, etc. The same esters and different modifications thereof vary in molecular weight. Modifications of polymerized vinyl esters and solutions of the same in solvents such as ethyl acetate have a viscosity of from 0.1 to over 4000 according to the Hercules-powder falling drop method at 25° C.

We have found that polymerized vinyl ester lacquers can be advantageously produced by combining alcohol soluble polymerized vinyl ester modifications. It is also possible, by addition of other supplements such as resins, pigments, dyestuffs, cellulose derivatives, softening means, oils, etc., to bring all the desired features in agreement by a suitable selection of the components so that the desired purpose is sometimes exactly realized. Such supplements may be added in the known manner, as by dissolving or emulsifying them in the lacquers, or in the solvents for the polymerized esters, or by incorporation into the polymerized esters by melting, kneading, etc. Also, the viscosity of the polymerized esters may be varied by varying the amount of solvent in the known manner. A low-viscous modification has a viscosity of from about 0.1 to 160, and a high-viscous modification has a viscosity of from above 160 to over 4000, the viscosity being determined by the above method. Alcohol, aromatic hydrocarbons, or mixtures of the same with acetic acid ester, vinyl ester, acetone, trichlorethylene, epichlorhydrin and the like may be used as solvents. The solvents and the concentration of the solution will be governed by the kind of lacquer desired, according to the rules of the lacquer industry.

Example 1

An adhesive lacquer for weather-proof gluings can be produced by combining high-viscous polymerized vinyl acetate of about 400 viscosity with low-viscous polymerized vinyl butyrate of about 20 viscosity. A lacquer, the solid particles of which contain, for instance, one part high-voscous polymerized vinyl acetate and one part of low-viscous polymerized vinyl butyrate, glues excellently, contains sufficient particles, and is weather-proof.

Example 2

A colorless squirt lacquer can be produced by combining high- and low-viscous polymerized vinyl acetate of viscosities of about 160 and 0.1 respectively in the ratio of one part of high-viscous to two parts of the low-viscous modification. The said combination can be squirted in technically useful concentrations without stringing and also gives a quick drying elastic film without the addition of softening means. It is understood that resins, pigments, dyestuffs, cellulose derivatives, softening means, oils, etc., may be incorporated in these combinations as desired.

Example 3

For producing a leather lacquer, 100 parts of high-viscous polymerized vinyl acetate of viscosity of about 1000 may be combined with 130 parts of low-viscous polymerized vinyl acetate of viscosity of about 10. Titan white is used as a pigment and a mixture of spirit and acetic ester in the proportion of four to one respectively may be used as a solvent or diluent. The softening means may be tri-cresyl-phosphate. This lacquer can be squirted. The film can also be worked to produce a good lustre.

While we have specifically described the preferred embodiment of our invention, it is to be understood that the invention is not to be limited to all of the details hereinbefore described, but may be otherwise embodied within the scope of the following claims.

The invention claimed is:

1. A lacquer comprising a mixture of high and low viscosity polymerized vinyl esters soluble in a mixture of four parts spirit and one part acetic ester.

2. A lacquer comprising a mixture of high and low viscosity polymerized vinyl acetates soluble in a mixture of four parts spirit and one part acetic ester.

3. A lacquer comprising a mixture of one part of high viscosity polymerized vinyl ester and from about one part to about 1.3 parts of low viscosity polymerized vinyl ester soluble in a mixture of four parts spirit and one part acetic ester.

4. A lacquer comprising a mixture of one part of high viscosity polymerized vinyl acetate and from about one part to about 1.3 parts of low viscosity polymerized vinyl acetate soluble in a mixture of four parts spirit and one part acetic ester.

5. A lacquer comprising a mixture of one part of high viscosity polymerized vinyl acetate and from about one part to about 1.3 parts of low viscosity polymerized vinyl butyrate soluble in a mixture of four parts spirit and one part acetic ester.

6. A lacquer comprising a mixture of high and low viscosity polymerized vinyl esters soluble in a mixture of four parts spirit and one part acetic ester, and a softening means.

7. A lacquer comprising a mixture of high and low viscosity polymerized vinyl esters soluble in a mixture of four parts spirit and one part acetic ester, and a member selected from the group consisting of cellulose derivatives, softening means, and oils.

WILLY O. HERRMANN.
WOLFRAM HAEHNEL.